United States Patent [19]

Shuler

[11] Patent Number: 4,545,793
[45] Date of Patent: Oct. 8, 1985

[54] AIR FILTER SYSTEM WITH SUPPORTING AND SEALING GRID

[75] Inventor: Bernard R. Shuler, Louisville, Ky.

[73] Assignee: Allis-Chalmers Corporation, Milwaukee, Wis.

[21] Appl. No.: 564,570

[22] Filed: Dec. 22, 1983

[51] Int. Cl.[4] ............................................. B01D 46/00
[52] U.S. Cl. ...................................... 55/355; 55/484; 55/495; 55/502; 52/484
[58] Field of Search ................. 52/144, 280, 484, 664, 52/665, 668, 669; 55/355, 483, 484, 493, 495, 502, DIG. 31

[56] References Cited

U.S. PATENT DOCUMENTS

| | | | |
|---|---|---|---|
| 1,189,492 | 7/1913 | Schanman | 52/664 |
| 3,485,519 | 12/1969 | Chiu | 52/665 |
| 3,486,311 | 12/1969 | Allan, Jr. | 55/355 |
| 3,716,259 | 2/1973 | Weill et al. | 52/280 |
| 4,047,348 | 9/1977 | McSweeney | 52/484 |
| 4,088,463 | 5/1978 | Smith | 55/502 X |
| 4,233,044 | 11/1980 | Allan | 55/355 |

Primary Examiner—Charles Hart
Attorney, Agent, or Firm—Donald C. McGaughey

[57] ABSTRACT

A filter supporting and sealing arrangement including a filter support grid having support beams with each beam defining parallel channels carrying a fluid sealant. The grid defines filter openings receiving filters with peripheral flanges on each filter forming a knife edge received in the fluid sealant of the channels for sealing the filter when it is in the normal operating position.

4 Claims, 7 Drawing Figures

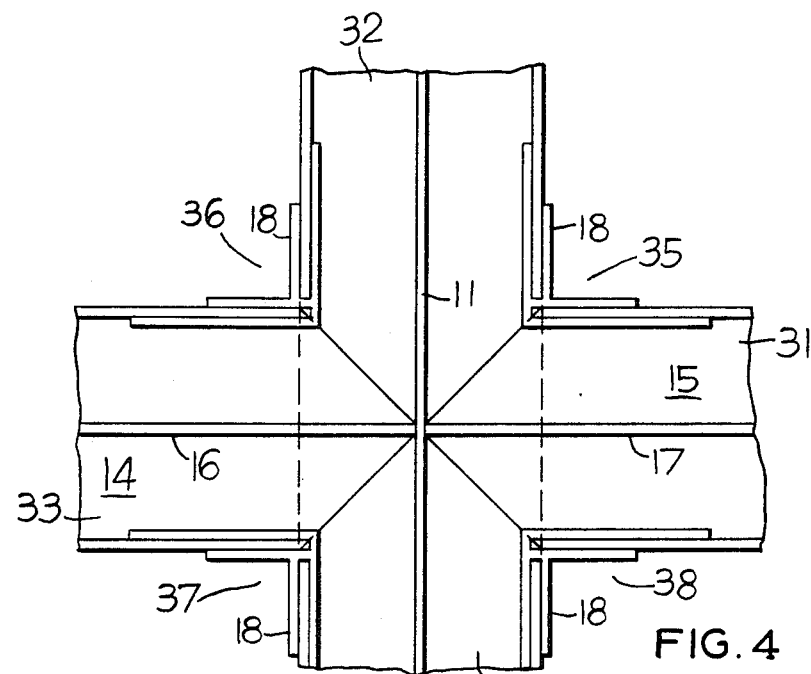
FIG. 4
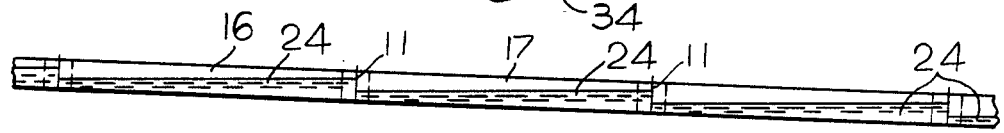
FIG. 5
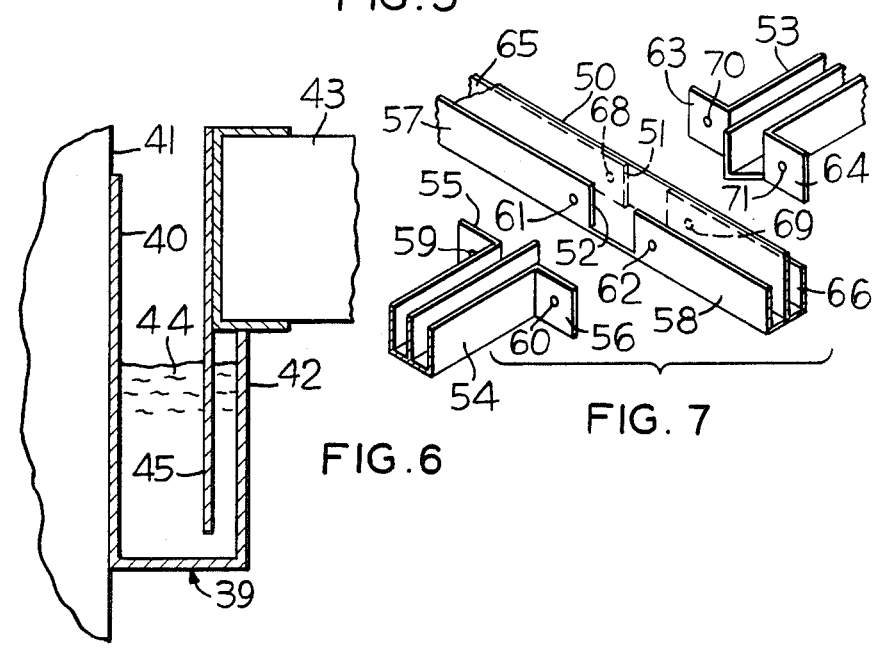
FIG. 6
FIG. 7

AIR FILTER SYSTEM WITH SUPPORTING AND SEALING GRID

This invention relates to an air filtering system and more particularly to a sealing grid including double channels forming filter openings with an independent perimeter channel chamber around the filter openings for receiving and sealing of a peripheral flange on a single filter received in each perimeter channel chamber which is filled with a sealant to form an airtight seal between the filter and the supporting grid.

Clean room facilities, such as areas used for the production of precision instruments or tooling, generally require an even temperature and a dust free environment. Covering the entire ceiling with a filtering medium allows a gentle flow of filtered air into the room at a reduced air velocity with a decreased filter resistance and power required in the air filtering system. A latticework is required to support the filters and a suitable sealing material must be provided at the periphery of the filters to avoid any leakage and assure complete filtering of the air entering the room.

The Allan, Jr. patent, U.S. Pat. No. 3,486,311, provides for a channel grid work in which a knife edge on the periphery of each filter is allowed to seat in the channel and form an air seal between the filter and the grid work. The knife edges of adjacent filters are received in the same channel. The channels extend the length and breadth of the room and all channels are in continuous comunication with each other. The applicant's invention provides for a double channel arrangement in which the knife edge of each filter is received in a separate channel isolated from the channel receiving the knife edge of the adjacent filter. This allows removal of any one filter for replacement with another filter as may be required without disturbing the seal of the adjacent filter. It also provides for a shorter channel chamber since the center wall formed by each channel member operates as a divider to isolate each perimeter channel chamber around each filter element. This decreases the need for a precisely level condition of the grid work because each channel chamber is essentially the length and width of the filter and is much shorter than that of the Allan, Jr. patent in which the channel chamber is the length and width of the room. Because of the shorter chamber length and width, fewer hangers are needed to support the grid work and greater flexibility of hanger location is permitted to allow for ducts, pipes, etc. The whole grid work need not be the same level, but perimeter channel chambers can be leveled individually. Accordingly, these improved features are believed to patentably distinguish the applicant's invention over this patent.

Accordingly, it is an object of this invention to provide a sealed filter arrangement including, a filter supporting latticework of channels with fluid sealant retained in each of a plurality of perimeter channel chambers with each chamber positioned around a filter opening. A filter element having a peripheral flange is received in the perimeter channel chamber around each filter opening to provide a leak proof filter assembly.

It is another object of this invention to provide a sealed filter bank to provide clean air filtering requirements.

It is a further object of this invention to provide a filter supporting latticework having channels defining filter openings and a perimeter channel chamber retaining sealant around each filter opening adapted to receive a peripheral flange of each filter element to form a leak proof filter assembly.

The objects of this invention are accomplished by a latticework formed by filter support members with main members running parallel the length of the ceiling and cross members both formed of a double channel construction and with fluid sealant received in each perimeter channel chamber around each filter opening. The filter openings are covered by a filter element having a downwardly extending peripheral flange extending into the fluid sealant in the channel chamber to form a sealed filter assembly. Each perimeter channel chamber is essentially the size of the filter.

Referring to the drawings, the preferred embodiment of this invention is illustrated.

FIG. 4 is the plan view of the assembled intersection of the filter supporting member;

FIG. 5 is a side elevation view showing the isolated chambers around each of the filter openings;

FIG. 6 is a cross-section view taken through a wall supported channel with the filter in the operating position; and FIG. 7 is an exploded view of a modification of the channel intersection.

Figure 1:
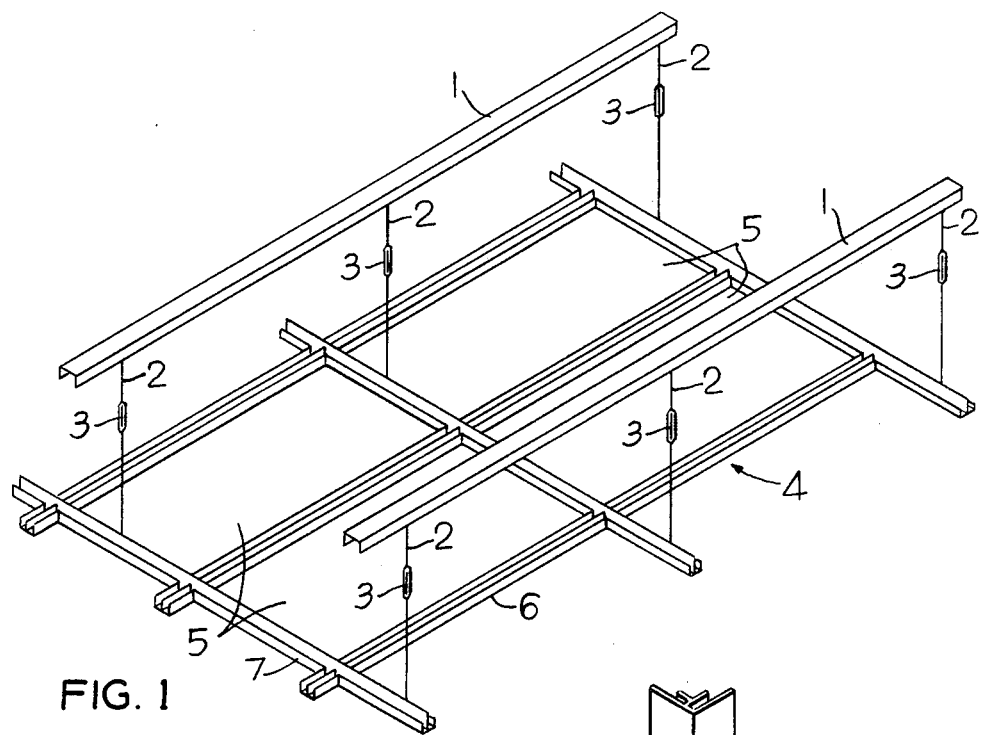
FIG. 1 is an isometric view of the latticework supported from the ceiling with leveling adjustments on the supporting structure.

Referring to the drawings, FIG. 1 illustrates an isometric view of the latticework and its supporting structure. The support beams 1 are mounted on the ceiling of the room and each one carries a plurality of supporting struts 2 having a turnbuckle adjusting means. This provides a means of adjusting the level of the latticework 4 to assure retention of the liquid in the individual channel chambers around each of the plurality of filter openings 5.

Figure 2:
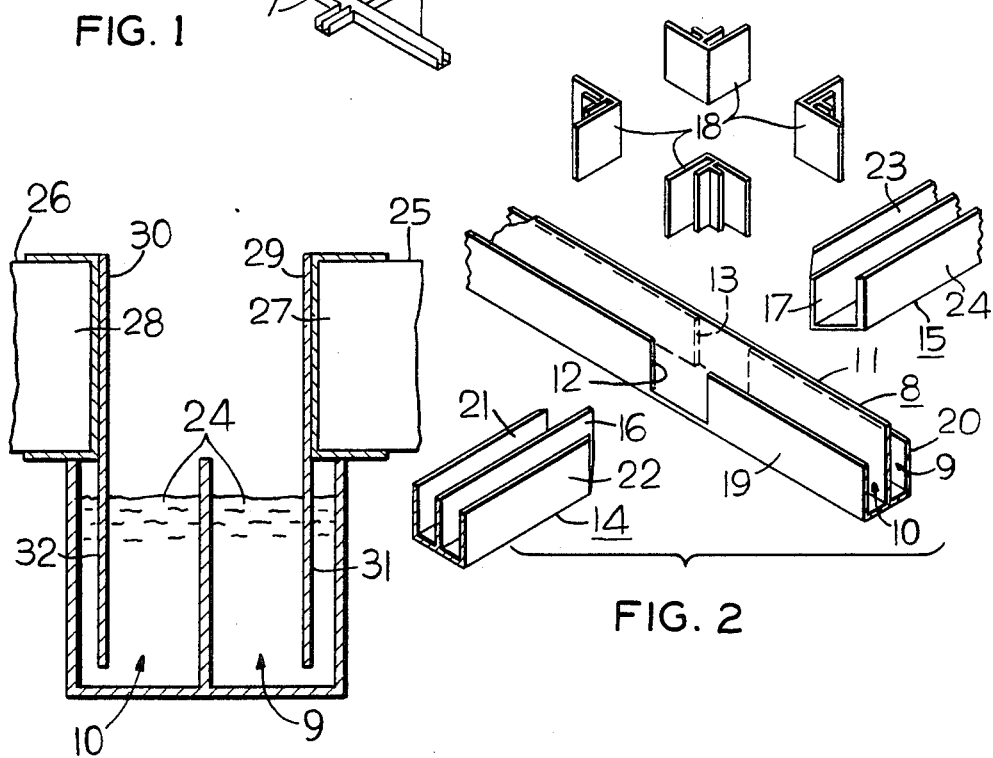
FIG. 2 is an exploded view of the channel intersection at the corner of each filter opening.

The filter supporting members 6 and 7 run lengthwise and crosswise in the room and intersect to form individual channel chambers around each filter opening. The filter supporting member 7 (FIG. 1) constitutes a main filter support member as is more specifically shown and identified by number 8 (in FIG. 2). The filter supporting member 6 (FIG. 1) constitutes a cross filter support member as is more specifically shown and identified by numbers 14, 15 (in FIG. 2). Each main and cross filter support member 8, 14, 15 has a center wall such as center walls 11, 16, 17 (FIG. 2) and two side walls such as side walls 19, 20; 21, 22 and 23, 24 in FIG. 2 spaced from their respective center walls 11, 16, 17. All of the walls of each support member, that is, the center wall and the spaced side walls, extend upward from a common bottom wall to define therebetween first and second adjacent fluid sealant retaining channel chambers 9, 10 (FIG. 2). Preferably each center wall is a single wall which is common to both the first and second channel chambers.

FIG. 2 illustrates a manner of constructing the intersection of the filter supporting members. A main filter supporting member 8 forms a double channel with a sealant retaining channel chamber 9 and sealant retaining channel chamber 10. A center dividing wall 11 is connected to a strut 2 placed along the length of the wall to support the main filter supporting member. At intervals along the length of the member 8, a segment is cut away to form openings 12 and 13 to receive cross members 14 and 15. The cross members 14 and 15 extend into the openings 12 and 13 until the center walls 16 and 17 abut the center wall 11 of the main filter supporting member. Filter supporting member 8 forms separate chambers that interconnect with the chambers of the cross members. When the cross members are inserted in position, the brackets 18 are then positioned on the side walls 19 and 20 of the main filter supporting member 8 and the side walls 21 and 22 of the cross member 14 as well as the side walls 23 and 24 of the cross member 15. This fixes the assembly in its normal operating position and a caulking material may be used to seal the intersecting walls and bottom walls of the filter supporting members.

From the above description, and with reference to FIG. 2, it will be understood that the center wall 11 of each main filter support member 8 is connected in fluid tight relation only to the center walls 16, 17 of abutting cross filter support members 14, 15. The side walls 19, 20 of the main filter support member 8 are connected in fluid tight relation only to the side walls 21, 22 and 23, 24 of abutting cross filter support members 14 and 15, respectively. These connections, as will be more fully described hereinafter, create an assembly providing a fluidally continuous, upwardly open individual channel chamber, such as chambers 31, 32, 33, 34 (FIG. 4) around each individual filter receiving opening.

Figure 3:
FIG. 3 is a cross-section view taken through a filter supporting channel cross member in the assembled position with the filters in the operating position.

FIG. 3 is a cross-section view of a filter supporting channel member with the sealant 24 in each of the channel chambers. For the purpose of illustration, it will be assumed that the filter supporting member is cross member 14 and the center wall 16 is essentially the same height as the two side walls 21, 22. However, as shown in FIG. 2, the main filter support member 8 has a center wall 11 which is higher than either of the side walls 19, 20 to facilitate ease of attaching the supporting struts 2. Each filter 25 and 26 includes a filtering material 27 and 28. A peripheral flange 29 and 30 on each of the two filters extends into the sealant chamber to form a sealed interface 31 and 32 around the portion of the flange extending into the sealant 24. The sealant is a heavy viscous material which allows the filter to seat in the operating position and allows the sealant to flow around the flange. Since the sealant is a viscous material, it flows slowly around to form the seal and does not present a problem of splashing due to vibration or any other movement so long as the assembly remains substantially level.

Referring to FIG. 4, the plan view of the assembled components as illustrated and described in FIG. 2 are shown. The brackets 18 are in position to retain the cross members 14 and 15 in their assembled position on member 8. The center walls 16 and 17 abut the center wall 11 to form a seal at their intersection. This forms fluid tight peripheral channel chambers 31, 32, 33, 34 around each of the filter openings 35, 36, 37 and 38. Each peripheral channel chamber 31, 32, 33, 34 is independent of and not in fluid communication with any of the other peripheral channel chambers. Since each perimeter channel chamber is isolated from its adjacent channel chamber, the net effect is an isolation of the sealed fluid in adjacent chambers and any filter can be replaced with another filter without interfering with the seal of the adjacent filter.

FIG. 5 illustrates the effect of the fluid sealant seeking its own level. It does not run over the walls since the length of the channel chamber is limited by a partition on the end of each channel chamber. Although it is perferred to have a level ceiling, minor imperfections may be present or may be caused due to the settling of a building. Because of this preferred construction, the danger of leakage is eliminated.

FIG. 6 illustrates a wall supported channel 39 in which the side wall 40 of the channel 39 is supported on the wall 41 of the room. The interior wall 42 of the channel provides a support for the filter 43. The sealant 44 provides a seal around the peripheral flange 45 extending into the sealant. The operation of this channel is the same as that provided in the channel chambers as illustrated in FIG. 4, although only a single channel is necessary since it is mounted on the wall.

FIG. 7 illustrates a modification of the construction of the latticework wherein the main filter support member 50 is formed with openings 50 and 51 to receive cross members 53 and 54. Flanges 55 and 56 can be bolted or riveted to the side walls 57 and 58 through the openings 59, 60, 61 and 62, provided, similarly, flanges 63 and 64 can be bolted or riveted to the side walls 65 and 66 through openings 67, 68, 69 and 70.

The filter device operates in substantially the following manner. The support beams 1 are carried on the ceiling of the room and the struts 2 are carried on the support beams which in turn carry the latticework 4. The level of the latticework can be adjusted by the turnbuckles 3 to assure a reasonably level position of the latticework. The intersections are then joined by placing the brackets 18 in their assembled position to retain the main filter support members 8 with the cross filter support members 14 and 15 as shown in FIG. 2 and assembled in FIG. 4. A caulking material can be used to assure seal integrity at the intersection once the assembly is made. When the assembly is completed, the sealant which is a viscous material having a melting temperature above normal room temperature is added to each perimeter channel chamber. The sealant is heated and poured into the channel chambers 9 and 10, as shown in FIG. 3, to reach the desired height in the chamber so that they will cover the lower ends of the flanges 29 and 30 of the filters. When this level is reached, the filters then can be seated in position so that they rest and are supported by the side walls of the channels as indicated in FIG. 3 and in FIG. 6. It is not necessary that the channels be pressed into the sealant since the sealant, although viscous, will allow the filter to settle in position and form an airtight seal around the filter once it is assembled. When it is assembled in the position as shown in FIGS. 3 and 6, the filter assembly provides an airtight sealing and filtering arrangement to assure clean air operating conditions when the heating or air conditioning ventilating system is in operation.

The embodiments of the invention in which an exclusive property or privilege is claimed are defined as follows:

1. An air filter system comprising:
   A. a latticework supported from the ceiling of a room;
   B. said latticework formed by main filter support members and cross filter support members extending lengthwise and crosswise of said room to define a plurality of filter receiving openings;

C. said main filter support members and cross filter support members each having walls defining a fluid tight channel which receives a fluid sealant;

D. a filter element mounted in each filter receiving opening and having flanges extending downwardly into said fluid sealant; and wherein the improvement comprises:

E. said main filter support members and cross filter support members each having a center wall and two side walls spaced from said center wall, said walls all extending upwardly from a bottom wall to define first and second adjacent fluid sealant retaining channel chambers;

F. said center wall of each of said main filter support members being connected in fluid tight relation only to the center walls of said abutting cross filter support members;

G. said side walls of said main filter support members being connected in fluid tight relation only to the side walls of abutting cross filter support members; and H. said center wall and side wall fluid tight connections creating a fluidally continuous, upwardly open individual channel chamber around the periphery of each individual filter receiving opening with each of said peripheral channel chambers being independent of and not in fluid communication with any of the other peripheral channel chambers thereby requiring that only each individual channel chamber be level when in an installed position and permitting withdrawal of any individual filter element and its associated flanges without disturbing the fluid sealant around the flanges of adjacent filter elements.

2. An air filter system as set forth in claim 1 wherein said center wall comprises a single wall which is common to both channel chambers.

3. An air filter system as set forth in either claim 11 or claim 2 wherein said center wall of said main filter support member is higher than either of said side walls.

4. An air filter system as set forth in claims 1, 2 or 3 wherein each of said filter elements is supported in its installed position by said side walls and wherein said peripheral flanges do not contact said bottom wall.

* * * * *